(12) United States Patent
Matsushima et al.

(10) Patent No.: US 10,385,810 B2
(45) Date of Patent: Aug. 20, 2019

(54) INTAKE SYSTEM OF INTERNAL COMBUSTION ENGINE WITH SUPERCHARGER

(71) Applicant: AISIN SEIKI KABUSHIKI KAISHA, Kariya-shi, Aichi-ken (JP)

(72) Inventors: Kazuya Matsushima, Kariya (JP); Yoichi Oyamada, Kariya (JP); Daigo USA, Nagoya (JP); Yoshiyuki Kawai, Nagoya (JP); Kohei Hotta, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 264 days.

(21) Appl. No.: 15/298,711

(22) Filed: Oct. 20, 2016

(65) Prior Publication Data

US 2017/0107955 A1 Apr. 20, 2017

(30) Foreign Application Priority Data

Oct. 20, 2015 (JP) ................................ 2015-206255

(51) Int. Cl.
*F02M 35/10* (2006.01)
*F02M 26/02* (2016.01)
(Continued)

(52) U.S. Cl.
CPC .... *F02M 35/10157* (2013.01); *F01M 13/023* (2013.01); *F02B 33/00* (2013.01);
(Continued)

(58) Field of Classification Search
CPC ....... F02M 35/10229; F02M 35/10222; F02M 2013/027; F02M 13/023; F02D 2009/0205
See application file for complete search history.

(56) References Cited

U.S. PATENT DOCUMENTS

| | | | |
|---|---|---|---|
| 8,181,633 B2* | 5/2012 | Ito ........................... | F02B 31/06 123/568.17 |
| 2009/0090337 A1* | 4/2009 | Asanuma ............. | F01M 13/022 123/574 |

(Continued)

FOREIGN PATENT DOCUMENTS

| | | | | |
|---|---|---|---|---|
| DE | 102015213982 | * | 1/2017 | ........... F01M 13/023 |
| EP | 1 959 117 A1 | | 8/2008 | |

(Continued)

OTHER PUBLICATIONS

Extended European Search Report dated Jan. 20, 2017, by the European Patent Office in corresponding European Patent Application No. 16194373.3-1616. (9 pages).

(Continued)

*Primary Examiner* — Jason D Shanske
*Assistant Examiner* — Jessica L Kebea
(74) *Attorney, Agent, or Firm* — Buchanan Ingersoll & Rooney PC

(57) ABSTRACT

An intake system of an internal combustion engine with a supercharger includes: a negative pressure control valve which is disposed in the upstream side than an intake side supercharger in an intake passage; a first external gas introduction passage which introduces a single external gas made of blow-by gas, at a part of the intake passage which is on the upstream side of the intake side supercharger and on the downstream side of the negative pressure control valve; and a fresh air introduction passage which introduces fresh air to an internal combustion engine main body from the upstream side of the negative pressure control valve.

21 Claims, 4 Drawing Sheets

(51) Int. Cl.
  *F02M 26/17* (2016.01)
  *F02M 25/06* (2016.01)
  *F01M 13/02* (2006.01)
  *F02D 9/02* (2006.01)
  *F02B 33/00* (2006.01)
  *F02B 37/00* (2006.01)

(52) U.S. Cl.
  CPC ............... *F02B 37/00* (2013.01); *F02D 9/02* (2013.01); *F02M 25/06* (2013.01); *F02M 26/02* (2016.02); *F02M 26/17* (2016.02); *F02M 35/10222* (2013.01); *F02M 35/10229* (2013.01); *F01M 2013/027* (2013.01); *F02D 2009/022* (2013.01); *Y02T 10/121* (2013.01); *Y02T 10/144* (2013.01)

(56) References Cited

U.S. PATENT DOCUMENTS

| | | |
|---|---|---|
| 2010/0000213 A1 | 1/2010 | Onishi et al. |
| 2010/0313830 A1 | 12/2010 | Ruppel et al. |
| 2014/0318514 A1* | 10/2014 | Pursifull ............... F01M 13/022 123/568.29 |
| 2015/0114348 A1* | 4/2015 | Pursifull .......... F02M 35/10229 123/403 |
| 2016/0115911 A1* | 4/2016 | Newman ................ F01M 13/02 123/568.11 |

FOREIGN PATENT DOCUMENTS

| | | | |
|---|---|---|---|
| JP | 1-136615 U | 9/1989 | |
| JP | H11-13553 A | 1/1999 | |
| JP | 2001-304050 A | 10/2001 | |
| JP | 2012-047093 A | 3/2012 | |
| JP | 2012-97683 A | 5/2012 | |
| JP | 2013-164053 A | 8/2013 | |
| JP | 2015-063975 A | 4/2015 | |
| JP | 2016223314 A * | 12/2016 | ............. F01M 13/00 |
| JP | 2017002790 A * | 1/2017 | ............. F01M 13/00 |

OTHER PUBLICATIONS

Office Action (Notice of Reasons for Refusal) dated Jun. 11, 2019, by the Japanese Patent Office in corresponding Japanese Patent Application No. 2015-206255, and an English Translation of the Office Action. (10 pages).

\* cited by examiner (FIRST EMBODIMENT)

INTAKE SYSTEM OF INTERNAL COMBUSTION ENGINE WITH SUPERCHARGER

CROSS REFERENCE TO RELATED APPLICATIONS

This application is based on and claims priority under 35 U.S.C. § 119 to Japanese Patent Application 2015-206255, filed on Oct. 20, 2015, the entire contents of which are incorporated herein by reference.

TECHNICAL FIELD

This disclosure relates to an intake system of an internal combustion engine with a supercharger.

BACKGROUND DISCUSSION

In the related art, an intake system of an internal combustion engine with a supercharger is known (for example, refer to US2014/0318514A (Reference 1)).

The above-described Reference 1 discloses a ventilation system (intake system of an internal combustion engine with a supercharger) in an internal combustion engine with a turbocharger (supercharger). In the ventilation system in the internal combustion engine, an intake passage in which a throttle valve (negative pressure control valve), a compressor (intake side supercharger), an air cooler, a throttle valve, and an intake manifold, are disposed in this order, is connected to an internal combustion engine main body. In addition, an exhaust passage in which an exhaust manifold, an exhaust turbine, and an exhaust processing device (catalyst device) are disposed in this order, is connected to the internal combustion engine main body. In addition, in a state where a blow-by passage derived from a crankcase and an EGR gas passage derived from the exhaust passage merge into one external gas passage, the external gas passage is connected between the throttle valve and the compressor. In addition, the upstream side of the throttle valve and the crankcase communicate with each other via a fresh air introduction passage. Accordingly, while operating the internal combustion engine, a mixed gas of blow-by gas (non-combusted air-fuel mixture including combusted gas) and EGR gas (exhaust gas) is introduced to the exhaust passage by using a negative pressure which is generated at a connection part of the external gas passage as intake gas is throttled by the throttle valve, and the fresh air is supplied to the crankcase via the fresh air introduction passage.

However, in the ventilation system in the internal combustion engine described in the above-described Reference 1, since the blow-by gas passage and the EGR gas passage are connected between the throttle valve and the compressor in the intake passage in a state where the blow-by passage and the EGR gas passage merge into one external gas passage, moisture or particulate materials included in the EGR gas, and oil components included in the blow-by gas, are mixed with each other, and deposits (sediments) are more likely to be generated. In addition, as the deposits (sediments) are deposited on an inner wall of the one external gas passage, a probability that the external gas passage will block increases. Therefore, there is a problem that a sufficient ventilation performance of the internal combustion engine main body cannot be obtained.

SUMMARY

Thus, a need exists for an intake system of an internal combustion engine with a supercharger which is not suspectable to the drawback mentioned above.

An intake system of an internal combustion engine with a supercharger according to an aspect of this disclosure includes: a negative pressure control valve which is disposed in the upstream side than an intake side supercharger in an intake passage; a first external gas introduction passage which introduces a single external gas made of blow-by gas, at a part of the intake passage which is on the upstream side of the intake side supercharger and on the downstream side of the negative pressure control valve; and a fresh air introduction passage which introduces fresh air to an internal combustion engine main body from the upstream side of the negative pressure control valve.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, the embodiments of this disclosure will be describe based on the drawings.

First Embodiment

First, with reference to FIGS. 1 to 6, a configuration of an engine 100 according to a first embodiment of this disclosure will be described.

Schematic Configuration of Engine with Supercharger

Figure 1:
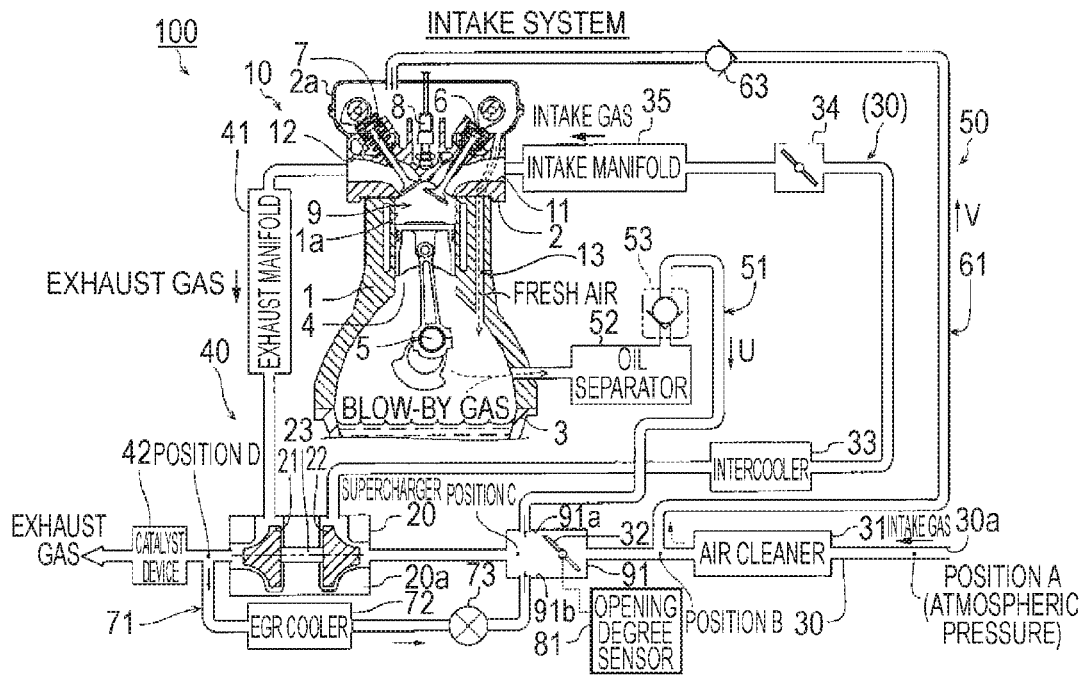
FIG. 1 is a view schematically illustrating a configuration of an engine with a supercharger according to a first embodiment of this disclosure.

As illustrated in FIG. 1, the engine 100 (an example of an internal combustion engine with a supercharger) for a vehicle (automobile) according to the first embodiment of this disclosure includes an engine main body 10 (internal combustion engine main body). The engine main body 10 includes: a cylinder block 1 in which a plurality of cylinders (cylinders 1a) are formed; a cylinder head 2 which is fastened to an upper part of the cylinder block 1; a crankcase 3 which is fastened to a lower part of the cylinder block 1; and a head cover 2a which covers the cylinder head 2. In addition, an intake passage 30 and an exhaust passage 40 are connected to the engine main body 10. As a piston 4 reciprocates in the cylinder block 1, one cycle of suction, compression, expansion (combustion), and exhaust is continuously repeated, and a crank shaft 5 is rotated.

In the cylinder head 2, an intake valve 6 and an exhaust valve 7 which are periodically open and closed by the rotation of a cam shaft, and an ignition plug 8, are incorporated. The cylinder head 2 includes a combustion chamber 9, an intake port 11 which sends inhaled air to the combustion chamber 9, and an exhaust port 12 which discharges exhaust gas. In addition, on the inside of the cylinder head 2, a fresh air communication path 13 which communicates with a space between the cylinder head 2 and the head cover 2a, and the crankcase 3, is provided.

In addition, the engine 100 made of a gasoline engine is provided with an exhaust turbine driving type supercharger (turbocharger) 20. In other words, in the supercharger 20, a turbine wheel 21 and a compressor wheel 22 (intake side supercharger) which are connected to a turbine shaft 23, are accommodated to be rotatable in a housing 20a. In addition, in the supercharger 20, the turbine wheel 21 is connected to the downstream side of an exhaust manifold 41, and the compressor wheel 22 is connected to the intake passage 30 which is on the upstream side of an intercooler 33. In the supercharger 20, the turbine wheel 21 is rotated by an exhaust gas flow, and the compressor wheel 22 is rotated. Accordingly, the intake gas which is suctioned to the compressor wheel 22 becomes compressed air, and is supplied to the cylinder 1a. In the engine 100, since a larger amount of air is supplied to the cylinder 1a, and charging efficiency increases compared to a non-supercharged engine with the same exhaust amount, an engine output increases.

In addition, the engine 100 is provided with an intake system 50 including the intake passage 30. The intake system 50 has a role of returning blow-by gas (an example of the single external gas) which leaks to the inside of the crankcase 3 from the combustion chamber 9 through a void between the piston 4 and the cylinder 1a, to the intake passage 30, a role of ventilating the inside of the crankcase 3 by supplying fresh air diverged from the intake passage 30 to the engine main body 10, and a role of introducing (recirculating) EGR gas (an example of another external gas different from the blow-by gas) of a part of the exhaust gas exhausted to the outside from the combustion chamber 9, to the cylinder 1a.

Configuration of Intake Passage and Exhaust Passage

In the intake passage 30, toward the intake port 11 from an air intake port 30a, the compressor wheel 22, the intercooler 33, a throttle valve 34 (an example of a throttle valve), and an intake manifold 35, are connected to each other in this order in an air cleaner 31, a negative pressure control valve 32, the supercharger 20. In addition, an opening area of the intake passage 30 when the throttle valve 34 is rotated to the completely closed side, is smaller than an opening area of the intake passage 30 when the negative pressure control valve 32 is rotated to the completely closed side. Here, the air intake port 30a which is on the upstream side of the air cleaner 31 having an atmospheric pressure is a position A, a part which is on the downstream side of the air cleaner 31 and on the upstream side of the negative pressure control valve 32 is a position B, and a part which is on the downstream side of the negative pressure control valve 32 and on the upstream side of the compressor wheel 22 is a position C.

The air cleaner 31 has a role of decreasing intake noise by removing dust in the intake gas. The negative pressure control valve 32 has a role of generating a pressure difference between the upstream side (position B) and the downstream side (position C) of the negative pressure control valve 32 by throttling a section of the intake passage as a valve body 92 is rotated. In this case, a pressure of the position C decreases to be lower than that of the position B. The intercooler 33 has a role of cooling the inhaled air compressed by the compressor wheel 22. The throttle valve 34 has a role of controlling the inhaled air amount. The intake manifold 35 includes an intake tube group (not illustrated) which is branched at a surge tank and on the downstream side thereof, and the downstream side of the intake tube group is connected to the intake port 11.

In the exhaust passage 40, toward a muffler (not illustrated) from the exhaust port 12, the exhaust manifold 41 which gathers the exhaust gas discharged from the combustion chamber 9, the turbine wheel 21 in the supercharger 20, and a catalyst device (catalyst converter) 42 are connected in this order.

In addition, in the first embodiment, as illustrated in FIG. 1, the intake system 50 including the intake passage 30 is provided with a blow-by gas passage 51 (an example of a first external gas introduction passage), a fresh air introduction passage 61, and an EGR gas passage 71 (an example of a second external gas introduction passage) which are provided separately from one another.

Specific Configuration of Intake System

The blow-by gas passage 51 communicates with the position C of the intake passage 30 which is on the upstream side of the compressor wheel 22 and on the downstream side of the negative pressure control valve 32, and the crankcase 3 in the engine main body 10, and has a role of introducing the blow-by gas from the crankcase 3 to the intake passage 30 at the position C. In addition, an oil separator 52 which separates oil mist in the blow-by gas is connected to the engine main body 10. In the oil separator 52, non-combusted air-fuel mixture and the oil mist are separated from each other, and the separated liquid oil returns to the crankcase 3. In addition, at an output portion of the oil separator 52, a check valve 53 which prevents a counter flow of the blow-by gas after the separation of the oil which flows in the arrow U direction, is provided.

The fresh air introduction passage 61 communicates with the position B of the intake passage 30 which is on the upstream side of the negative pressure control valve 32 and on the downstream side of the air cleaner 31, and the head cover 2a in the engine main body 10, and has role of branching and introducing the fresh air to the head cover 2a from the position B. In addition, in the fresh air introduction passage 61, a check valve 63 for preventing a counter flow of the fresh air which flows in the arrow V direction, is provided.

The EGR gas passage 71 is provided separately from the blow-by gas passage 51, and communicates with a position D of the exhaust passage 40 which is on the downstream side of the turbine wheel 21 and on the upstream side of the catalyst converter 42, and the position C of the intake passage 30 which is on the upstream side of the compressor wheel 22 and on the downstream side of the negative pressure control valve 32. Accordingly, the EGR gas passage 71 has a role of introducing the EGR gas which flows in the arrow W direction to the intake passage 30 from the position C. The EGR gas passage 71 includes an EGR cooler 72 which cools the exhaust gas, and an EGR control valve 73 which adjusts the introduction amount (EGR ratio) of the exhaust gas after the cooling.

Therefore, in the engine 100, at the position C which is on the downstream side of the negative pressure control valve 32, each of the blow-by gas and the EGR gas is introduced to the intake passage 30. In addition, by providing the intake system 50, opening degree adjustment of the negative pressure control valve 32 is performed in accordance with an operation state of the engine 100, and the ventilation of the engine main body 10 (crankcase 3) is performed.

For example, in a case where a rotation speed and a load of the engine 100 is relatively small (low), and the supercharger 20 does not achieve the function thereof, the negative pressure control valve 32 is closed only by a predetermined opening degree. In other words, by a throttling operation of the negative pressure control valve 32 when the engine 100 is in an idling state or is operated by a low (intermediate) rotation and a low (intermediate) load, a differential pressure is generated between the upstream (position B) and the downstream side (position C) of the negative pressure control valve 32. In other words, the pressure of the position C decreases to be lower than that of the position B, and due to a suction force of the negative pressure generated at the position C, the blow-by gas from the crankcase 3 is introduced to the intake passage 30 via the blow-by gas passage 51. In addition, since an inner pressure of the crankcase 3 is maintained to be in a state of a negative pressure which is slightly lower than the atmospheric pressure (positive pressure), the fresh air after passing the air cleaner 31 of which the pressure is close to the atmospheric pressure, is supplied into the head cover 2a via the fresh air introduction passage 61 from the position B, and is introduced to the crankcase 3 via the fresh air communication path 13. In addition, in a state where the rotation speed of the supercharger 20 is low, by the negative pressure in the crankcase 3, the fresh air is also supplied to the head cover 2a.

In addition, even when the supercharging (the throttle valve 34 is in a completely opened state) in which the rotation speed and the load of the engine 100 is relatively large (high) and the supercharger 20 achieves the function thereof, the negative pressure control valve 32 is closed only by a predetermined opening degree. In other words, the pressure of the position C becomes lower than that of the position B when viewed from the negative pressure control valve 32, and due to the negative pressure generated at the position C, the blow-by gas from the engine main body 10 (crankcase 3) is introduced to the intake passage 30 via the blow-by gas passage 51. In addition, the fresh air after passing the air cleaner 31 of which the pressure is close to the atmospheric pressure, is introduced to the crankcase 3 which maintains a negative pressure via the fresh air introduction passage 61 from the position B. In this manner, in the entire operation region in the engine 100, the negative pressure is generated (the opening degree decreases) at a part (position C) of the intake passage 30 which is on the upstream side of the compressor wheel 22 and on the downstream side of the negative pressure control valve 32.

Figure 2:
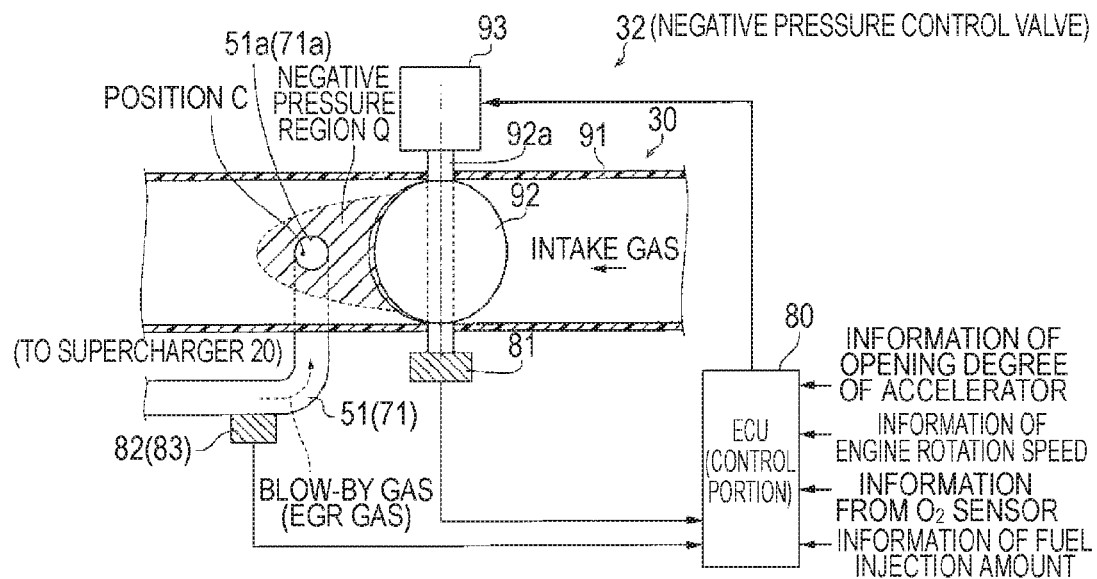
FIG. 2 is an upper view schematically illustrating a configuration of a negative pressure control valve according to the first embodiment of this disclosure.

In addition, as a controlling configuration of the intake system 50, as illustrated in FIG. 2, an opening degree sensor 81 which detects the opening degree of the negative pressure control valve 32, a flow rate sensor 82 which detects a blow-by gas flow rate, a flow rate sensor 83 which detects an EGR gas flow rate, a motor 93 which drives the negative pressure control valve 32, and the EGR control valve 73 (refer to FIG. 1), are electrically connected to an ECU (control portion) 80 which supervises control of the engine 100.

In the ECU 80, opening degree information from an accelerator opening degree sensor, rotation speed information of the engine 100, information from an $O_2$ sensor (oxygen sensor) provided in the exhaust passage 40, and information on a fuel injection amount, are input. The ECU 80 performs predetermined determination based on the information, and performs control of adjusting the opening degree of the negative pressure control valve 32 and the opening degree of the EGR control valve 73 while operating the engine 100 by driving the motor 93. In addition, the introduction of the EGR gas is determined by the opening degree control of the EGR control valve 73. In other words, even when the negative pressure is generated at the position C by the throttling operation of the negative pressure control valve 32, in a case where the EGR control valve 73 is completely closed based on the operation state of the engine 100, the EGR gas is not introduced to the intake passage 30.

In addition, the negative pressure control valve 32 is provided with a valve body 91, a butterfly type valve body 92 which has a rotating shaft 92a and is accommodated in the valve body 91, and the above-described motor 93 and the opening degree sensor 81. In addition, in a case where the negative pressure control valve 32 is closed only by a predetermined opening degree, a negative pressure region Q (hatching region) in which the negative pressure (suction force) is the highest is generated on the downstream side of the negative pressure control valve 32.

Here, in the first embodiment, in the valve body 91, an opening 51a to which the blow-by gas is introduced, and an opening 71a to which the EGR gas is introduced, are provided. The openings 51a and 71a are disposed on an inner wall of the valve body 91 which corresponds to the negative pressure region Q. The opening 51a is positioned on an inner wall 91a (refer to FIG. 1) on a ceiling side of the valve body 91, and the opening 71a is positioned on an inner wall 91b (refer to FIG. 1) on a bottom part side of the valve body 91. Accordingly, the blow-by gas introduced from the position C is introduced to the intake passage 30 from the negative pressure region Q generated on the downstream side of the negative pressure control valve 32, and the EGR gas is also introduced to the intake passage 30 from the negative pressure region Q generated on the downstream side of the negative pressure control valve 32.

Figure 3:
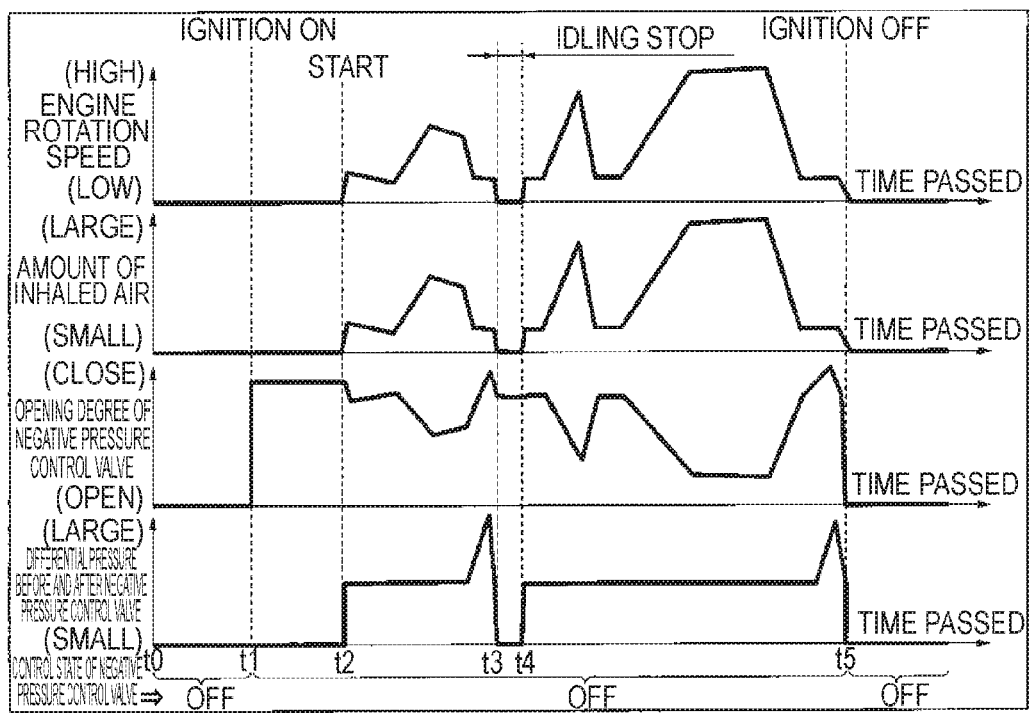
FIG. 3 is a view illustrating an operation aspect of the negative pressure control valve according to the first embodiment of this disclosure.
Figure 4:
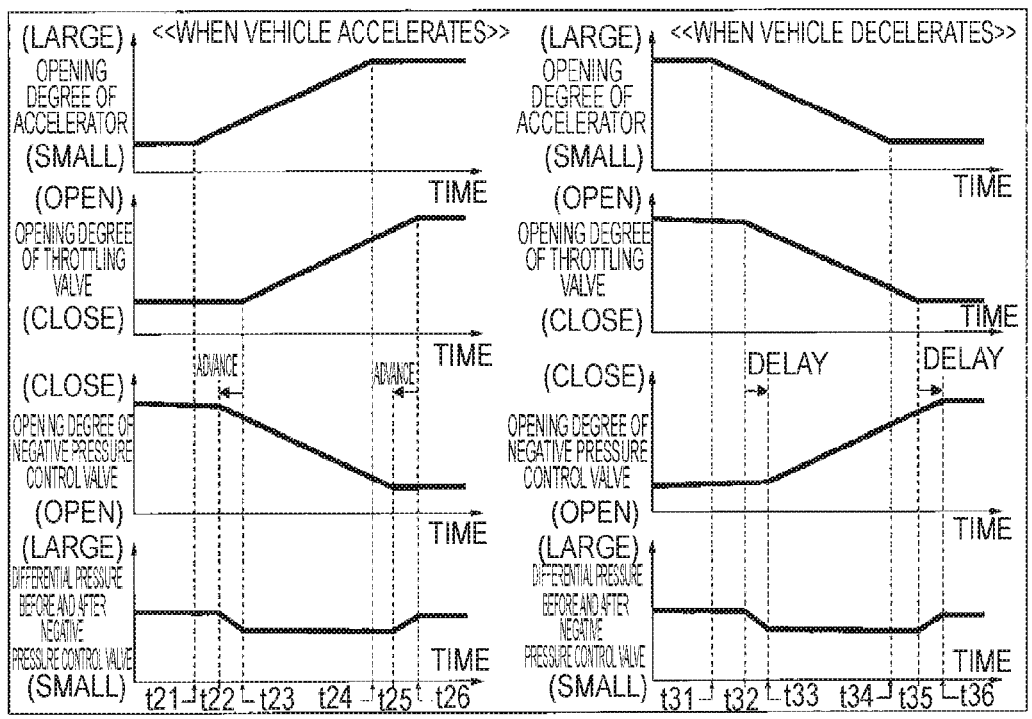
FIG. 4 is a view illustrating an operation aspect of the negative pressure control valve according to the first embodiment of this disclosure.
Figure 5:
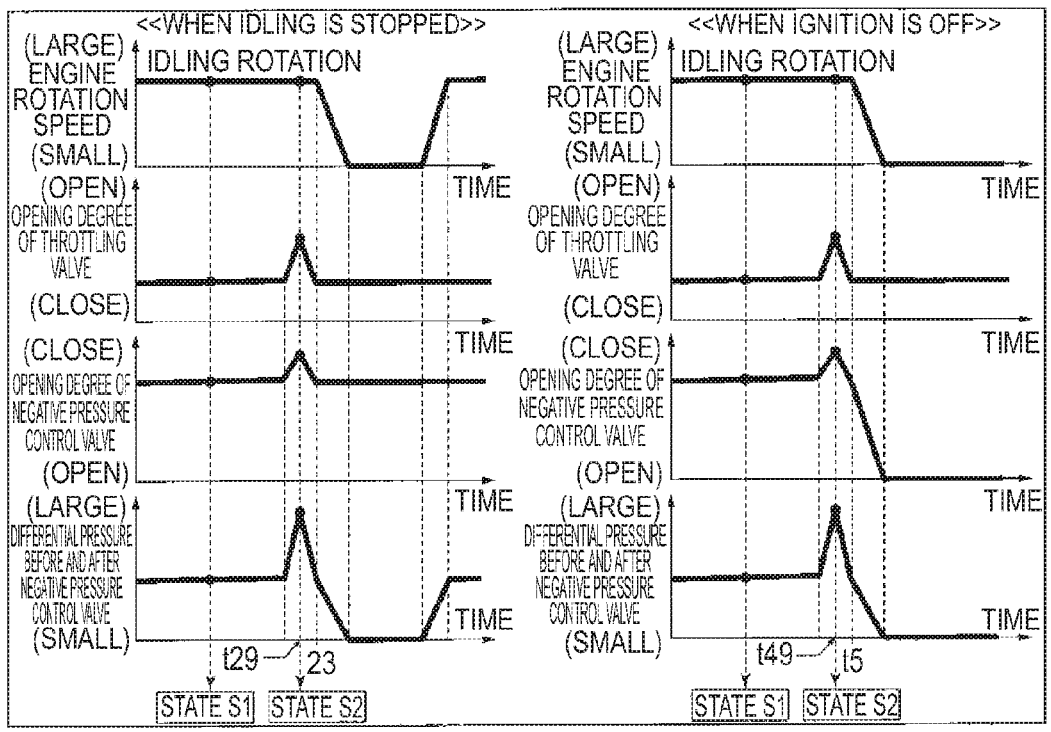
FIG. 5 is a view illustrating an operation aspect of the negative pressure control valve according to the first embodiment of this disclosure.

Operation Contents of Negative Pressure Control Valve in Operation State of Engine Next, with reference to FIG. 3, contents of the operation control of the negative pressure control valve 32 (refer to FIG. 1) in a series of operation modes in which the engine 100 (refer to FIG. 1) in a stopped state is started to be operated, the vehicle travels only by a predetermined distance, and then, the vehicle is stopped, will be described.

First, in a state where the engine is stopped (period from time t0 to time t1), the negative pressure control valve 32 is maintained to be in a completely open state based on the command of the ECU 80 (refer to FIG. 2). In addition, according to an ignition ON state (time t1) by the operation of an occupant, the negative pressure control valve 32 is changed to a completely closed state based on a command of the ECU 80. After this, the negative pressure control valve 32 moves to an opening degree control state together with the engine start at time t2. In other words, the opening degree of the negative pressure control valve 32 is controlled (increases and decreases) to follow variation in engine rotation speed (amount of inhaled air) according to the travel of the vehicle. In addition, accordingly, since the pressure difference (differential pressure) is generated between the upstream side and the downstream side of the negative pressure control valve 32, the blow-by gas (and the EGR gas) is introduced to the intake passage 30 (refer to FIG. 1) at the position C, and the ventilation in the crankcase 3 (refer to FIG. 1) is performed.

Here, the vehicle accelerates from time t2 to time t3. In this case, as illustrated in four graphs on a left side in FIG. 4, based on a start of increase in accelerator opening degree at time t21, the opening degree of the throttle valve 34 (refer to FIG. 1) increases at time t23. Therefore, the engine 100 is moved from a low load state to a high load state. At this time, in the first embodiment, the opening degree of the negative pressure control valve 32 increases at a timing of time t22 which is earlier than that of the throttle valve 34. Accordingly, when the intake amount increases when the vehicle accelerates, the opening degree of the negative pressure control valve 32 increases before the opening degree of the throttle valve 34 increases. After this, in a case where the acceleration is stopped at time t24, the increase in opening degree of the throttle valve 34 is stopped at time t26, but the opening degree control is performed so that the increase in opening degree of the negative pressure control valve 32 is stopped at a timing of time t25, which is earlier than time t26.

Next, the vehicle decelerates. In this case, as illustrated in four graphs on a right side in FIG. 4, the opening degree of the throttle valve 34 decreases at time t32 based on the start of decrease in opening degree of the accelerator at time t31. Therefore, the engine 100 is moved from a high load state to a low load state. At this time, in the first embodiment, the opening degree of the negative pressure control valve 32 decreases at a timing of time t33 which is later than that when the opening degree of the throttle valve 34 decreases. Accordingly, when the intake amount decreases when the vehicle decelerates, the decrease in the opening degree of the negative pressure control valve 32 is more delayed than the decrease in the opening degree of the throttle valve 34. In addition, in a case where the deceleration is stopped at time t34, the decrease in opening degree of the throttle valve 34 is also stopped at time t35, but the opening degree control is performed so that the decrease in opening degree of the negative pressure control valve 32 is stopped at a timing of time t36 being more delayed than time t35.

In addition, while the vehicle travels, in a case where the vehicle is temporarily stopped due to waiting for a traffic light or the like, the engine 100 at an idling rotation speed is temporarily stopped based on the command of the ECU 80. In a state where the idling is stopped, as illustrated in four graphs on a left side in FIG. 5, the opening degree of the throttle valve 34 increases at a timing of time t29 immediately before the engine 100 is stopped at time t3, and the opening degree of the negative pressure control valve 32 decreases. In addition, after the vehicle travels only by a predetermined distance, the vehicle decelerates and is stopped. In addition, in a case where the engine 100 is in an ignition OFF state by the operation of the occupant in a state where the idling rotation speed is achieved, as illustrated in four graphs on a right side in FIG. 5, the opening degree of the throttle valve 34 increases at a timing of time t49 immediately before the engine 100 is stopped at time t5, and the opening degree of the negative pressure control valve 32 decreases. In other words, when the engine 100 is stopped when the idling is stopped, and when the engine 100 is stopped when the ignition is OFF, the flow rate (flow velocity) of the blow-by gas which is introduced to the intake passage 30 (position C), instantaneously increases.

In addition, a distribution state of the inner pressure of the intake passage 30 in a state S1 (refer to FIG. 4) of the intake passage 30 at the idling rotation speed and in a state S2 (refer to FIG. 4) of the intake passage 30 immediately before the above-described engine 100 is actually stopped, will be described with reference to FIG. 6.

Figure 6:
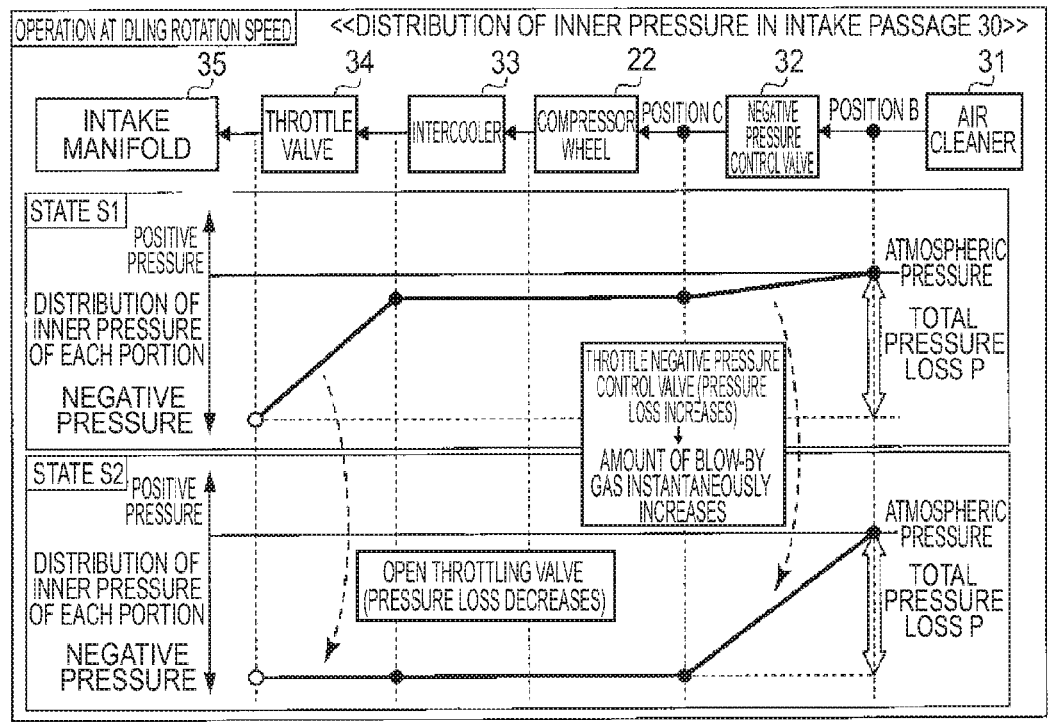
FIG. 6 is a view illustrating an operation aspect of the negative pressure control valve according to the first embodiment of this disclosure.

As illustrated in FIG. 6, in the state S1, since the rotation speed is maintained as the idling rotation speed, while the opening degree of the throttle valve 34 mainly decreases, the opening degree of the negative pressure control valve 32 does not decrease to that extent. Therefore, a state where the pressure difference (differential pressure) between before and after the throttle valve 34 is relatively large, and the pressure difference (differential pressure) between before and after the negative pressure control valve 32 is relatively small, is achieved. In addition, pressure loss from the downstream side of the air cleaner 31 to an inlet of the intake manifold 35, is obtained as total pressure loss P. In addition, in the state S2 (timing of time t29 or time t39 in FIG. 4) immediately before the engine 100 changes to the state where the idling is stopped (or a state of being completely stopped), the opening degree of the throttle valve 34 increases, and the opening degree of the negative pressure control valve 32 decreases. Therefore, although being instantaneous, a state where the pressure difference between before and after the throttle valve 34 is relatively small, and the pressure difference between before and after the negative pressure control valve 32 is relatively large, is achieved. However, the total pressure loss P is maintained to be the same value as that of a case of state S2 and state S1. In the step S2, while maintaining the total pressure loss P, the pressure difference (suction force) at the position C (refer to FIG. 1) increases since the opening degree of the negative pressure control valve 32 instantaneously decreases, and the introduction amount of the blow-by gas instantaneously increases. The intake system 50 which is mounted on the engine 100 according to the first embodiment, is configured as described above.

Effects of First Embodiment

In the first embodiment, the following effects can be obtained.

In the first embodiment, as described above, at the position C of the intake passage 30 which is on the upstream side of the compressor wheel 22 and on the downstream side of the negative pressure control valve 32, the blow-by gas passage 51 which introduces the single blow-by gas, is provided. Accordingly, since it is possible to introduce (return) only the blow-by gas which is not mixed with the EGR gas or the like to the intake passage 30 via the blow-by gas passage 51 by using the negative pressure by the negative pressure control valve 32, deposits (sediments) which are generated when a plural types of external gas are mixed with each other are not generated on the inner wall of the blow-by gas passage 51. Therefore, since it is possible to introduce the blow-by gas without blocking the blow-by gas passage 51, it is possible to obtain a sufficient ventilation performance of the engine main body 10.

In addition, in the first embodiment, the blow-by gas passage 51 which introduces the single blow-by gas to the position C of the intake passage 30 which is on the upstream side of the compressor wheel 22 and on the downstream side of the negative pressure control valve 32, and the fresh air introduction passage 61 which introduces the fresh air to the head cover 2a from the position B which is on the upstream side of the negative pressure control valve 32, are provided. Accordingly, at the same time when the blow-by gas is introduced (returns) to the intake passage 30 from the engine main body 10 via the blow-by gas passage 51, it is possible to supply the fresh air which is on the upstream side of the negative pressure control valve 32 to the crankcase 3 via the fresh air introduction passage 61. Accordingly, since it is possible to reliably perform replacement of the fresh air and the blow-by gas in the engine main body 10, it is possible to achieve a sufficient ventilation performance with respect to the engine main body 10.

In addition, in the first embodiment, the EGR gas passage 71 which introduces the EGR gas to the position C of the intake passage 30 which is on the upstream side of the compressor wheel 22 and on the downstream side of the negative pressure control valve 32, and the blow-by gas passage 51, are provided separately from each other. Accordingly, since it is possible to independently introduce (return) the EGR gas to the intake passage 30 via the EGR gas passage 71, it is also possible to suppress generation of the deposits caused by the mixing of the blow-by gas with other gas on the inner wall of the EGR gas passage 71. Accordingly, since it is possible to operate the engine 100 by effectively using not only the blow-by gas but also the EGR gas, it is possible to maintain a high quality of the engine 100.

In addition, in the first embodiment, in the entire operation region in the engine 100, the negative pressure control valve 32 is configured so that the negative pressure is generated (the opening degree decreases) at the position C of the intake passage 30 which is on the upstream side of the compressor wheel 22 and on the downstream side of the negative pressure control valve 32. Accordingly, it is possible to reliably perform ventilation in the crankcase 3 in a region having a wide width in which the rotation speed of the engine 100 ranges from a low rotation speed zone including an idling rotation zone to a high rotation speed zone and the load of the engine 100 ranges from no-load or a low load to a high load. At this time, since it is possible to always form a flow of the blow-by gas toward the position C of the intake passage 30 from the crankcase in the blow-by gas passage 51 by the throttling operation of the negative pressure control valve 32, it is possible to effectively prevent a pressure of the inside of the crankcase 3 in which the blow-by gas is generated, from becoming a positive pressure. Accordingly, it is also possible to easily prevent leakage of engine oil to the outside of the crankcase 3.

In addition, in the first embodiment, the blow-by gas is introduced to the intake passage 30 from the negative pressure region Q generated on the downstream side of the negative pressure control valve 32 via the blow-by gas passage 51. Accordingly, it is possible to reliably take the blow-by gas into the intake passage 30 from the negative pressure region Q generated on the downstream side of the negative pressure control valve 32 in which the negative pressure generated due to the operation of decreasing the opening degree of the negative pressure control valve 32 is the highest. Therefore, it is possible to maintain a high ventilation performance of the engine main body 10.

In addition, in the first embodiment, in a configuration in which the opening area of the intake passage 30 when the throttle valve 34 is the completely closed side is smaller than the opening area of the intake passage 30 when the negative pressure control valve 32 is the completely closed side, when the engine 100 moves from the low load state to the high load state, the opening degree of the negative pressure control valve 32 increases before the opening degree of the throttle valve 34 increases, and when the engine 100 moves from the high load state to the low load state, the opening degree of the negative pressure control valve 32 decreases after the opening degree of the throttle valve 34 decreases. Accordingly, when the intake amount increases when the vehicle accelerates, since the opening degree of the negative pressure control valve 32 increases before the opening degree of the throttle valve 34 increases, it is possible to suppress the increase in intake amount in a case where the opening degree of the negative pressure control valve 32 does not increase in advance, and a substantial increase in the differential pressure between before and after the negative pressure control valve 32. Accordingly, it is possible to suppress the increase in introduction amount of the blow-by gas caused by the increase in the differential pressure between before and after the negative pressure control valve 32. In addition, when the vehicle decelerates, under a situation in which the opening degree of the throttle valve 34 decreases, the intake amount decreases, and the pressure difference between before and after the negative pressure control valve 32 decreases, since the decrease in opening degree of the negative pressure control valve 32 is delayed than the decrease in the opening degree of the throttle valve 34 decreases, it is possible to suppress the substantial increase in differential pressure between before and after the negative pressure control valve 32 in a case where the decrease in the opening degree of the negative pressure control valve 32 is not delayed in a state of a smaller intake amount. Accordingly, it is possible to allow the increase in the differential pressure between before and after the negative pressure control valve 32 to be slow, and in this case, it is also possible to suppress a useless increase in intake amount of the blow-by gas.

In addition, in the first embodiment, immediately before the engine 100 is stopped, the opening degree of the throttle valve 34 increases, and the opening degree of the negative pressure control valve 32 decreases. Accordingly, since the opening degree of the negative pressure control valve 32 decreases while the opening degree of the throttle valve 34 increases, it is possible to stabilize the intake amount in an idling rotation state immediately before the rotation of the engine 100 is stopped without changing the total pressure loss of the intake passage 30. In addition, it is possible to instantaneously increase the pressure difference between before and after the negative pressure control valve 32 by decreasing the opening degree of the negative pressure control valve 32. Accordingly, since it is possible to instantaneously increase the flow velocity of the blow-by gas immediately before the operation of the engine 100 is stopped, blocking of the oil separator 52 which separates the oil mist included in the blow-by gas due to liquid oil or other foreign materials generated after oil separation can be avoided.

In addition, in the first embodiment, the fresh air introduction passage 61 is configured to communicate with the position A of the intake passage 30 which is on the upstream side of the negative pressure control valve 32 and on the downstream side of the air cleaner 31, and the head cover 2a. Accordingly, it is possible to remove the dust, and to reliably introduce the fresh air of which the pressure is close to the atmospheric pressure (positive pressure) to the engine main body 10 (crankcase 3).

Second Embodiment

Figure 7:
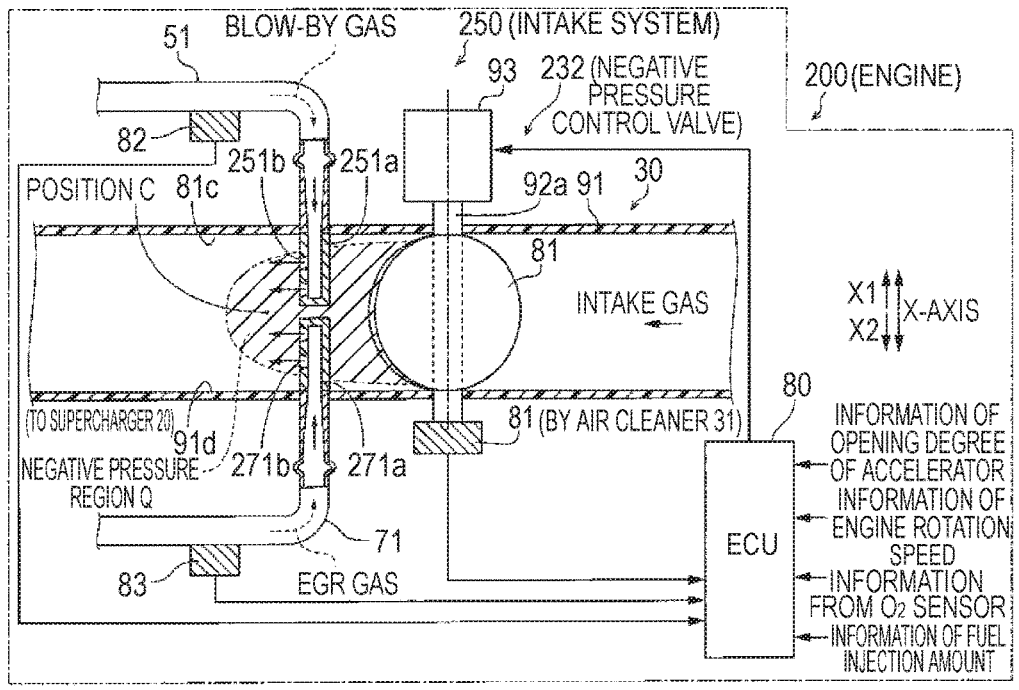
FIG. 7 is an upper view schematically illustrating a configuration of the negative pressure control valve according to a second embodiment of this disclosure.

Next, with reference to FIGS. 1, 7, and 8, a second embodiment will be described. In the second embodiment, an example in which an intake system 250 is configured by using a negative pressure control valve 232 having a structure different from that of the above-described first embodiment, will be described.

In the intake system 250 which is employed in an engine 200 (internal combustion engine with a supercharger) in the second embodiment of this disclosure, the negative pressure control valve 232 is used. As illustrated in FIG. 7, the negative pressure control valve 232 is provided with an introduction portion 251a to which the blow-by gas is introduced, and an introduction portion 271a to which the EGR gas is introduced. The introduction portion 251a penetrates an inner wall 91c on one side (X1 side) of the valve body 91 in the X-shaft direction, extends in parallel to the rotating shaft 92a, and reaches a position near the center of the negative pressure region Q. Similarly, the introduction portion 271a penetrates an inner wall 91d on the other side (X2 side) of the valve body 91 in the X-shaft direction, extends in parallel to the rotating shaft 92a, and reaches the position near the center of the negative pressure region Q. In addition, in the introduction portion 251a, two circular openings 251b which are open toward the downstream side in the negative pressure region Q, are formed, and in the introduction portion 271a, two circular openings 271b which are open toward the downstream side in the negative pressure region Q, are formed.

Figure 8:
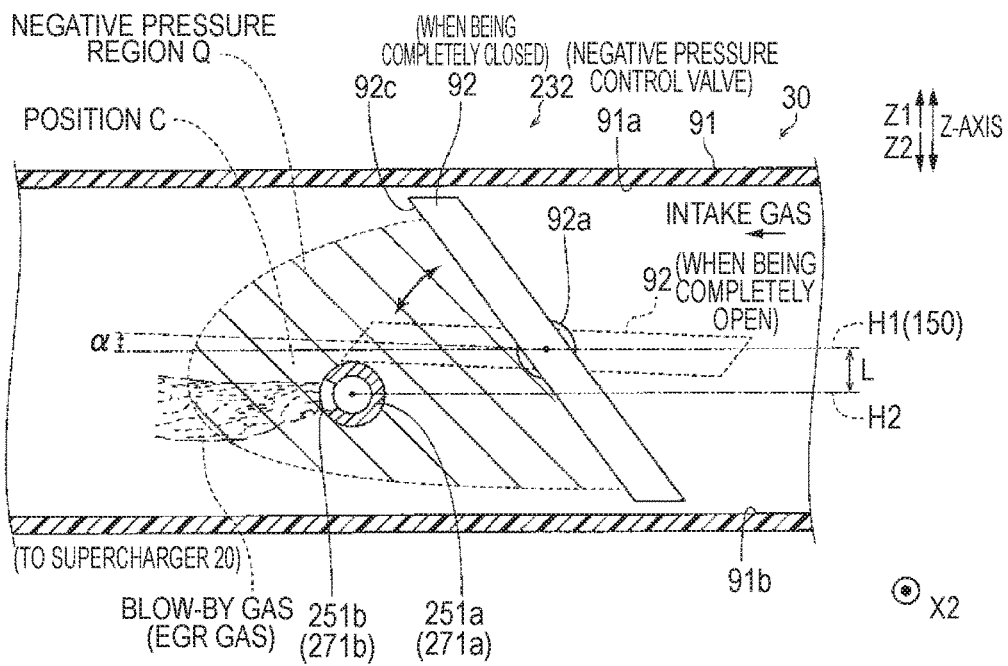
FIG. 8 is a sectional view schematically illustrating the configuration of the negative pressure control valve according to the second embodiment of this disclosure.

In addition, as illustrated in FIG. 8, the introduction portion 251a and the introduction portion 271a are provided at height positions H2 at which the shaft centers have the same height in a state of opposing each other in the X-shaft direction. In addition, a state where the valve body 92 of the negative pressure control valve 232 is completely closed is illustrated by a solid line, and a state of being completely open is illustrated by a broken line. In addition, in a case where the valve body 92 is controlled to be entirely open, the valve body 92 is also configured to control the opening degree having a predetermined angle α with respect to a line segment 150 (illustrated by a one-dot chain line) that extends in the intake flow direction from the shaft center (height position H1). In other words, since the angle α is provided even in the completely open state, the negative pressure control valve 232 is configured so that the negative pressure region Q is generated on the downstream side of the valve body 92, and the introduction portion 251a and the introduction portion 271a are disposed in the negative pressure region Q.

In addition, in a state where a tip end part in the intake downstream direction on a lower surface (rear surface) 92c of the valve body 92 abuts against an outer side surfaces of the introduction portions 251a and 271a, a distance L (Z-shaft direction) to the height position H2 of the introduction portion 251a (271a) with respect to the height position H1 of the rotating shaft 92a, is determined so that the angle α which is slightly upward from the intake flow direction is provided in the valve body 92. Therefore, the introduction portions 251a and 271a also perform a role of a stopper in a case where the valve body 92 is completely open. Accordingly, the blow-by gas which is introduced from the position C is introduced to the intake passage 30 from the negative pressure region Q generated on the downstream side of the negative pressure control valve 232. Similarly, the EGR gas is also introduced to the intake passage 30 from the negative pressure region Q generated on the downstream side of the negative pressure control valve 232.

In addition, in the second embodiment, as the control content of the negative pressure control valve 232 in the intake system 250, other than the operation region in which the engine 200 is in a high load state and is from the intermediate rotation speed zone to the high rotation speed zone, the opening degree of the negative pressure control valve 232 decreases so that the negative pressure is generated at a part (position C) of the intake passage 30 which is on the upstream side of the compressor wheel 22 and on the downstream side of the negative pressure control valve 232. This is different from that in the first embodiment.

Accordingly, in the second embodiment, while performing the ventilation of the engine main body 10 (crankcase 3) in a regular region other than the operation region which is in the high load state and is from the intermediate rotation speed zone to the high rotation speed zone, in the operation region which is in the high load state and is from the intermediate rotation speed zone to the high rotation speed zone, the ventilation of the engine main body 10 is temporarily stopped, the intake amount of the fresh air to the cylinder 1a (refer to FIG. 1) instantaneously increases (is supercharged), and the output reliability of the engine 200 is prioritized. In addition, other configurations in the second embodiment are similar to those of the above-described first embodiment.

Effects of Second Embodiment

In the second embodiment, as described above, other than the operation region which is in the high load state and is from the intermediate rotation speed zone to the high rotation speed zone in the engine 200, the negative pressure control valve 232 is configured so that the negative pressure is generated at the position C of the intake passage 30 which is on the upstream side of the compressor wheel 22 and on the downstream side of the negative pressure control valve 232. Accordingly, while the ventilation of the engine main body 10 is performed in the regular region other than the operation region which is in the high load state and is from the intermediate rotation speed zone to the high rotation speed zone, in the operation region which is in the high load state and is from the intermediate rotation speed zone to the high rotation speed zone, it is possible to temporarily stop the ventilation of the engine main body 10, to instantaneously increase (supercharge) the intake amount of the fresh air to the cylinder 1a, and to prioritize output reliability of the engine 200. Accordingly, while obtaining a ventilation performance in the regular region, it is possible to obtain the engine 200 which can achieve the highest output in a high level.

In addition, in the second embodiment, the introduction portion 251a to which the blow-by gas is introduced penetrates the inner wall 91c of the valve body 91, extends in parallel to the rotating shaft 92a, and is disposed in the negative pressure region Q, and the introduction portion 271a to which the EGR gas is introduced penetrates the inner wall 91d of the valve body 91, extends in parallel to the rotating shaft 92a, and is disposed in the negative pressure region Q. In this manner, the introduction portion 251a and the introduction portion 271a configure the negative pressure control valve 232. Accordingly, it is possible to reliably take the blow-by gas and the EGR gas into the intake passage 30 from the negative pressure region Q generated on the downstream side of the negative pressure control valve 232 in which the negative pressure (suction force) generated due to the opening degree decreasing operation by the negative pressure control valve 232 is the highest. In addition, other effects of the second embodiment are similar to those of the above-described first embodiment.

Modification Example

It is considered that the embodiments disclosed here are examples and are not restrictive from all of the viewpoint. The range of this disclosure is illustrated not by the description of the above-described embodiments but by the range of the appended claims, and further, includes all of the modifications (modification examples) within the meaning and range that are equivalent to the range of the appended claims.

For example, in the above-described first and second embodiments, this disclosure is employed in the intake system 50 of the engine 100 provided with the exhaust turbine driving type supercharger 20, but this disclosure is not limited thereto. In other words, this disclosure may be employed in the intake system of the engine provided with a supercharger which is driven by a driving force of the crank shaft 5.

In addition, in the above-described first and second embodiments, the EGR gas passage 71 is provided in the intake system 50 (250), but this disclosure is not limited thereto. In other words, the intake system of the internal combustion engine with a supercharger may be configured so that only the blow-by gas is introduced to the intake passage 30 from the position C which is on the downstream side of the negative pressure control valve 32 and on the upstream side of the compressor wheel 22.

In addition, in the above-described first embodiment, the openings 51a and 71a of the blow-by gas and the EGR gas are provided on the inner wall of the valve body 91 which is on the downstream side of the negative pressure control valve 32, and in the above-described second embodiment, the introduction portions 251a and 271a which extend to the negative pressure region Q from the inner wall of the valve body 91 on the downstream side of the negative pressure control valve 232 are provided, but this disclosure is not limited thereto. For example, a hollow flow path (the blow-by gas passage 51 and/or the EGR gas passage 71) may be provided in the rotating shaft 92a which rotates the valve body 92, and an opening which is open to the negative pressure region Q may be formed in the rotating shaft 92a.

In addition, in the above-described first embodiment, the openings 51a and 71a are provided on the inner wall of the valve body 91 which corresponds to the negative pressure region Q, and in the above-described second embodiment, the introduction portions 251a and 271a are provided in the negative pressure region Q, but this disclosure is not limited thereto. An introduction port (introduction portion) of blow-by gas and the EGR gas may be provided in the vicinity of the negative pressure region Q, and may be configured to introduce the blow-by gas and the EGR gas to the intake passage 30 by using the suction force of the negative pressure region Q.

In addition, in the above-described second embodiment, the introduction portions 251a and 271a are respectively provided, but this disclosure is not limited thereto. For example, one introduction tube which penetrates the negative pressure region Q which is along the rotating shaft 92a and on the downstream side thereof may be provided, and by dividing the center part of the introduction tube, the introduction portion 251a may be formed the X1 side, and the introduction portion 271a may be formed on the X2 side.

In addition, in the above-described second embodiment, the opening 251b (271b) is formed in the introduction portion 251a (271a) to have a circular shape, but this disclosure is not limited thereto. The opening which introduces the external gas may be formed in a nozzle shape, or may be formed in a slit shape (elongated shape). In addition, two openings 251b (271b) are provided, but this disclosure is not limited thereto. The number of openings may be one, or may be three. In addition, the introduction portion 251a and the introduction portion 271a may have different number of openings from each other.

In addition, in the above-described first and second embodiments, this disclosure is employed in the intake system 50 (250) which is mounted in the vehicle (automobile) provided with the engine 100 (200) configured of a gasoline engine, but this disclosure is not limited thereto. In other words, other than the gasoline engine, this disclosure can be employed in a diesel engine and a gas engine with a supercharger.

An intake system of an internal combustion engine with a supercharger according to an aspect of this disclosure includes: a negative pressure control valve which is disposed in the upstream side than an intake side supercharger in an intake passage; a first external gas introduction passage which introduces a single external gas made of blow-by gas, at a part of the intake passage which is on the upstream side of the intake side supercharger and on the downstream side of the negative pressure control valve; and a fresh air introduction passage which introduces fresh air to an internal combustion engine main body from the upstream side of the negative pressure control valve.

In the intake system of an internal combustion engine with a supercharger according to the aspect of this disclosure, as described above, the first external gas introduction passage which introduces the single external gas made of blow-by gas, is provided at a part of the intake passage which is on the upstream side of the intake side supercharger and on the downstream side of the negative pressure control valve. Accordingly, since it is possible to introduce (return) only the blow-by gas which is not mixed with another external gas (EGR gas or the like) to the intake passage by using the negative pressure due to the negative pressure control valve via the first external gas introduction passage, deposits (sediments) which are generated when plural types of external gas are mixed with each other, are not generated on the inner wall of the first external gas introduction passage. Therefore, since it is possible to introduce the blow-by gas without blocking the first external gas introduction passage, it is possible to obtain a sufficient ventilation performance of the internal combustion engine main body.

In addition, in the intake system of an internal combustion engine with a supercharger according to the aspect of this disclosure, the first external gas introduction passage which introduces the single external gas made of blow-by gas, and the fresh air introduction passage which introduces the fresh air to the internal combustion engine main body from the upstream side of the negative pressure control valve, are provided at a part of the intake passage which is on the upstream side of the intake side supercharger and on the downstream side of the negative pressure control valve. Accordingly, at the same time as when the blow-by gas from the internal combustion engine main body is introduced (returned) to the intake passage via the first external gas introduction passage, it is possible to supply the fresh air which is on the upstream side of the negative pressure control valve to the internal combustion engine main body via the fresh air introduction passage. According to this, since it is possible to reliably replace the fresh air and the blow-by gas with each other in the internal combustion engine main body, it is possible to achieve a more sufficient ventilation performance with respect to the internal combustion engine main body.

It is preferable that the intake system of an internal combustion engine with a supercharger according to the aspect of this disclosure further includes a second external gas introduction passage which is provided separately from the first external gas introduction passage, and introduces another external gas different from the blow-by gas to the part of the intake passage which is on the upstream side of the intake side supercharger and on the downstream side of the negative pressure control valve.

In this configuration, since it is possible to introduce (return) external gases separately from the blow-by gas to the intake passage via the second external gas introduction passage separately from the blow-by gas, it is possible to suppress generation of deposits caused by the mixing of the blow-by gas with the external gases on the inner wall of the second external gas introduction passage. Accordingly, since it is possible to operate the internal combustion engine with a supercharger by effectively using not only the blow-by gas but also the another external gas, it is possible to maintain a high quality of the internal combustion engine with a supercharger.

In the intake system of an internal combustion engine with a supercharger according to the aspect of this disclosure, it is preferable that the negative pressure control valve decreases an opening degree to allow a negative pressure to be generated at the part of the intake passage which is on the upstream side of the intake side supercharger and on the downstream side of the negative pressure control valve, in all of the operation regions.

In this configuration, it is possible to reliably perform ventilation of the internal combustion engine in a region having a wide width in which a rotation speed (engine rotation speed) of the internal combustion engine with a supercharger ranges from a low rotation speed zone including an idling rotation zone to a high rotation speed zone and a load (engine load) of the internal combustion engine with a supercharger ranges from no-load or a low load to a high load. At this time, since it is possible to always form a flow of the blow-by gas toward the intake passage from the internal combustion engine main body in the first external gas introduction path by a throttling operation of the negative pressure control valve, it is possible to effectively prevent a pressure of the inside of the internal combustion engine main body in which the blow-by gas is generated, from becoming a positive pressure. Accordingly, it is also possible to easily prevent leakage of engine oil to the outside of the internal combustion engine main body (crankcase).

In the intake system of an internal combustion engine with a supercharger according to the aspect of this disclosure, it is preferable that the negative pressure control valve decreases an opening degree to allow a negative pressure to be generated at the part of the intake passage which is on the upstream side of the intake side supercharger and on the downstream side of the negative pressure control valve, except for an operation region which is in a high load state and is from an intermediate rotation speed zone to a high rotation speed zone.

In this configuration, while performing ventilation of the internal combustion engine main body in a regular region other than the operation region which is in the high load state and is from the intermediate rotation speed zone to the high rotation speed zone, in the operation region which is in the high load state and is from the intermediate rotation speed zone to the high rotation speed zone, it is possible to temporarily stop the ventilation of the internal combustion engine main body, to instantaneously increase (supercharge) an intake amount of the fresh air to a cylinder, and to prioritize output reliability of the internal combustion engine with a supercharger. Accordingly, while obtaining a ventilation performance in the regular region, it is possible to obtain an internal combustion engine with a supercharger which can achieve the highest output in a high level.

In the intake system of an internal combustion engine with a supercharger according to the aspect of this disclosure, it is preferable that the single external gas made of the blow-by gas is introduced to the intake passage from a negative pressure region generated on the downstream side of the negative pressure control valve and the vicinity thereof via the first external gas introduction passage.

In this configuration, it is possible to reliably take the blow-by gas into the intake passage from the negative pressure region generated on the downstream side of the negative pressure control valve in which the negative pressure (suction force) generated due to an opening degree decreasing operation (throttling operation) of the negative pressure control valve is the highest, and the vicinity thereof. Therefore, it is possible to maintain a high ventilation performance of the internal combustion engine main body.

It is preferable that the intake system of an internal combustion engine with a supercharger according to the aspect of this disclosure further includes a throttle valve which is disposed in the downstream side than the intake side supercharger in the intake passage, an opening area of the intake passage when the throttle valve is rotated to the completely closed side is smaller than an opening area of the intake passage when the negative control valve is rotated to the completely closed side, and when moving from a low load state to a high load state, the opening degree of the negative pressure control valve increases before the opening degree of the throttle valve increases, and when moving from a high load state to a low load state, the opening degree of the negative pressure control valve decreases after the opening of the throttle valve decreases.

In this configuration, when the intake amount increases when a vehicle in which the internal combustion engine moves from a low load state to a high load state accelerates, or the like, since the opening degree of the negative pressure control valve increases before the opening degree of the throttle valve increases, it is possible to suppress a substantial increase in pressure difference (differential pressure) between before and after the negative pressure control valve, which occurs along with an increase in the intake amount in a case where the opening degree of the negative pressure control valve does not increase in advance. Accordingly, it is possible to suppress a useless increase in introduction amount of the blow-by gas caused by the increase in the differential pressure between before and after the negative pressure control valve. In addition, when a vehicle in which the internal combustion engine moves from a high load state to a low load state decelerates, or the like, in a situation in which the opening degree of the throttle valve decreases, the intake amount decreases, and a pressure difference between before and after the negative pressure control valve decreases, since the decrease in the opening degree of the negative pressure control valve is delayed with respect to the decrease in opening degree of the throttle valve, it is possible to suppress a substantial increase in differential pressure between before and after the negative pressure control valve, which occurs in a case where the decrease in the opening degree of the negative pressure control valve is not delayed in a state of a smaller intake amount. Accordingly, it is possible to allow the increase in differential pressure between before and after the negative pressure control valve to be slow. Therefore, in this case, it is also possible to suppress a useless increase in intake amount of the blow-by gas.

It is preferable that the intake system of an internal combustion engine with a supercharger according to the aspect of this disclosure further includes a throttle valve which is disposed in the downstream side than the intake side supercharger in the intake passage, the opening area of the intake passage when the throttle valve is rotated to the completely closed side is smaller than an opening area of the intake passage when the negative control valve is rotated to the completely closed side, and immediately before an operation of the internal combustion main body is stopped, the opening degree of the negative pressure control valve decreases as the opening degree of the throttle valve increases.

In this configuration, since the opening degree of the negative pressure control valve decreases while the opening degree of the throttle valve increases, it is possible to stabilize the intake amount in an idling rotation state immediately before the operation of the internal combustion engine main body is stopped without changing the total pressure loss of the intake passage. In addition, it is possible to instantaneously increase the pressure difference between before and after the negative pressure control valve by decreasing the opening degree of the negative pressure control valve. Accordingly, since it is possible to instantaneously increase a flow velocity of the blow-by gas immediately before the operation of the internal combustion engine main body is stopped, blocking of an oil separator which separates oil mist included in the blow-by gas due to liquid oil generated after oil separation or other foreign materials can be avoided.

In addition, in the specification, in the intake system of an internal combustion engine with a supercharger, the following configuration can also be considered.

APPENDIX 1

That is, in the intake system of an internal combustion engine with a supercharger according to the aspect of this disclosure, the fresh air introduction passage communicates with a part of the intake passage which is on the upstream side of the negative pressure control valve and on the downstream side of an air cleaner, and the internal combustion engine main body.

APPENDIX 2

In addition, in the intake system of an internal combustion engine with a supercharger according to the aspect of this disclosure, in which the blow-by gas is introduced to the intake passage from the negative pressure region and the vicinity thereof, the first external gas introduction passage includes an external gas introduction portion in which the single external gas made of the blow-by gas is mixed with intake gas penetrating a wall surface of the intake passage and extending to the negative pressure region.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the appended claims, be embraced thereby.

What is claimed is:

1. An intake system of an internal combustion engine with a supercharger comprising:
    a negative pressure control valve which is disposed upstream of a compressor of the supercharger in an intake passage;
    a first external gas introduction passage which introduces a single external gas made of blow-by gas, at a part of the intake passage which is on the upstream side of the compressor and on the downstream side of the negative pressure control valve; and
    a fresh air introduction passage which introduces fresh air to a main body of the internal combustion engine from the upstream side of the negative pressure control valve,
    wherein the negative pressure control valve is controllable to be completely open, and a valve body of the negative pressure control valve has a predetermined angle greater than zero with respect to an axis parallel to the intake passage extending through a shaft center of the negative pressure control valve and the valve body abuts against an introduction port of the first external gas introduction passage, when the negative pressure control valve is controlled to be completely opened.

2. The intake system of an internal combustion engine with a supercharger according to claim 1, further comprising:
    a second external gas introduction passage which is provided separately from the first external gas introduction passage, and introduces another external gas different from the blow-by gas to the part of the intake passage which is on the upstream side of the compressor and on the downstream side of the negative pressure control valve.

3. The intake system of an internal combustion engine with a supercharger according to claim 1,
    wherein an opening degree of the negative pressure control valve decreases to allow a negative pressure to be generated at the part of the intake passage which is on the upstream side of the compressor and on the downstream side of the negative pressure control valve, in all of a plurality of operation regions.

4. The intake system of an internal combustion engine with a supercharger according to claim 2,
    wherein an opening degree of the negative pressure control valve decreases to allow a negative pressure to be generated at the part of the intake passage which is on the upstream side of the compressor and on the downstream side of the negative pressure control valve, in all of a plurality of operation regions.

5. The intake system of an internal combustion engine with a supercharger according to claim 1,
    wherein an opening degree of the negative pressure control valve decreases to allow a negative pressure to be generated at the part of the intake passage which is on the upstream side of the compressor and on the downstream side of the negative pressure control valve, except for an operation region, of a plurality of operation regions, which is in a high load state and is from an intermediate rotation speed zone to a high rotation speed zone.

6. The intake system of an internal combustion engine with a supercharger according to claim 2,
    wherein an opening degree of the negative pressure control valve decreases to allow a negative pressure to be generated at the part of the intake passage which is on the upstream side of the compressor and on the downstream side of the negative pressure control valve, except for an operation region, of a plurality of operation regions, which is in a high load state and is from an intermediate rotation speed zone to a high rotation speed zone.

7. The intake system of an internal combustion engine with a supercharger according to claim 1,
wherein the single external gas made of the blow-by gas is introduced to the intake passage from a negative pressure region generated on the downstream side of the negative pressure control valve and the vicinity thereof via the first external gas introduction passage.

8. The intake system of an internal combustion engine with a supercharger according to claim 2,
wherein the single external gas made of the blow-by gas is introduced to the intake passage from a negative pressure region generated on the downstream side of the negative pressure control valve and the vicinity thereof via the first external gas introduction passage.

9. The intake system of an internal combustion engine with a supercharger according to claim 3,
wherein the single external gas made of the blow-by gas is introduced to the intake passage from a negative pressure region generated on the downstream side of the negative pressure control valve and the vicinity thereof via the first external gas introduction passage.

10. The intake system of an internal combustion engine with a supercharger according to claim 4,
wherein the single external gas made of the blow-by gas is introduced to the intake passage from a negative pressure region generated on the downstream side of the negative pressure control valve and the vicinity thereof via the first external gas introduction passage.

11. The intake system of an internal combustion engine with a supercharger according to claim 1, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and
wherein, when moving from a low load state to a high load state, the opening degree of the negative pressure control valve increases before an opening of the throttle valve increases, and when moving from a high load state to a low load state, the opening degree of the negative pressure control valve decreases after the opening of the throttle valve decreases.

12. The intake system of an internal combustion engine with a supercharger according to claim 2, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and
wherein, when moving from a low load state to a high load state, the opening degree of the negative pressure control valve increases before an opening of the throttle valve increases, and when moving from a high load state to a low load state, the opening degree of the negative pressure control valve decreases after the opening of the throttle valve decreases.

13. The intake system of an internal combustion engine with a supercharger according to claim 3, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and
wherein, when moving from a low load state to a high load state, the opening degree of the negative pressure control valve increases before an opening of the throttle valve increases, and when moving from a high load state to a low load state, the opening degree of the negative pressure control valve decreases after the opening of the throttle valve decreases.

14. The intake system of an internal combustion engine with a supercharger according to claim 4, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and
wherein, when moving from a low load state to a high load state, the opening degree of the negative pressure control valve increases before an opening of the throttle valve increases, and when moving from a high load state to a low load state, the opening degree of the negative pressure control valve decreases after the opening of the throttle valve decreases.

15. The intake system of an internal combustion engine with a supercharger according to claim 5, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and
wherein, when moving from a low load state to a high load state, the opening degree of the negative pressure control valve increases before an opening of the throttle valve increases, and when moving from a high load state to a low load state, the opening degree of the negative pressure control valve decreases after the opening of the throttle valve decreases.

16. The intake system of an internal combustion engine with a supercharger according to claim 1, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and
wherein, immediately before operation of the internal combustion engine is stopped, the opening degree of the negative pressure control valve decreases as the opening degree of the throttle valve increases.

17. The intake system of an internal combustion engine with a supercharger according to claim 2, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and wherein, immediately before operation of the internal combustion engine is stopped, the opening degree of the negative pressure control valve decreases as the opening degree of the throttle valve increases.

18. The intake system of an internal combustion engine with a supercharger according to claim 3, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and
wherein, immediately before operation of the internal combustion engine is stopped, the opening degree of the negative pressure control valve decreases as the opening degree of the throttle valve increases.

19. The intake system of an internal combustion engine with a supercharger according to claim 4, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and
wherein, immediately before operation of the internal combustion engine is stopped, the opening degree of the negative pressure control valve decreases as the opening degree of the throttle valve increases.

20. The intake system of an internal combustion engine with a supercharger according to claim 5, further comprising:
a throttle valve which is disposed downstream of the compressor in the intake passage,
wherein an opening area of the intake passage when the throttle valve is rotated to a closed side is smaller than an opening area of the intake passage when the negative control valve is rotated to a closed side, and
wherein, immediately before operation of the internal combustion engine is stopped, the opening degree of the negative pressure control valve decreases as the opening degree of the throttle valve increases.

21. An intake system of an internal combustion engine with a supercharger comprising:
a negative pressure control valve which is disposed upstream of a compressor of the supercharger in an intake passage;
an external gas introduction passage which introduces exhaust gas at a part of the intake passage which is on the upstream side of the compressor and on the downstream side of the negative pressure control valve; and
a fresh air introduction passage which introduces fresh air to a main body of the internal combustion engine from the upstream side of the negative pressure control valve,
wherein the negative pressure control valve is controllable to be completely open, and a valve body of the negative pressure control valve has a predetermined angle greater than zero with respect to an axis parallel to the intake passage extending through a shaft center of the negative pressure control valve and the valve body abuts against an introduction port of the first external gas introduction passage, when the negative pressure control valve is controlled to be completely opened.

* * * * *